Figure 1:
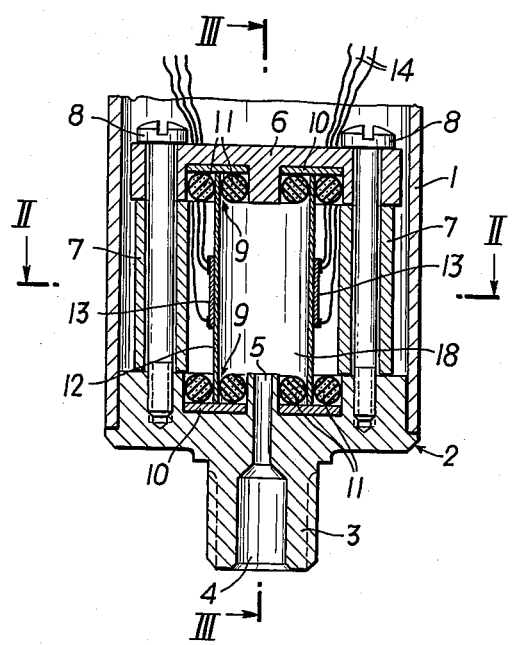

United States Patent [19]
Zeiringer

[11] 3,884,078
[45] May 20, 1975

[54] LOW-PRESSURE MEASURING TRANSFORMER

[75] Inventor: Rudolf Zeiringer, Graz, Austria

[73] Assignee: Hans List, Graz, Austria

[22] Filed: June 15, 1973

[21] Appl. No.: 370,449

[30] Foreign Application Priority Data
June 16, 1972 Austria ............................... 5221/72

[52] U.S. Cl. .................... 73/398 AR; 73/406; 338/4
[51] Int. Cl. .............................................. G01l 9/04
[58] Field of Search ............... 73/398 AR, 406, 407; 338/42, 4, 36; 92/98, 98 R, 102

[56] References Cited
UNITED STATES PATENTS
| | | | |
|---|---|---|---|
| 2,486,133 | 10/1949 | Egger | 73/392 |
| 2,729,730 | 1/1956 | Brady | 73/398 R |
| 2,751,530 | 5/1956 | Armstrong | 92/102 |

FOREIGN PATENTS OR APPLICATIONS
| | | | |
|---|---|---|---|
| 757,597 | 9/1956 | United Kingdom | 73/398 AR |

*Primary Examiner*—Donald O. Woodiel
*Attorney, Agent, or Firm*—Watson, Cole, Grindle & Watson

[57] ABSTRACT

A low-pressure measuring transformer, in particular for explosion-prevention devices, comprising an expansion joint internally impinged upon by the measuring pressure, carrying strain gauges and designed as a thin-walled tube, and supported with both of its open extremities by members of the measuring transformer located opposite each other in such a manner as to provide both elasticity and effective sealing.

6 Claims, 5 Drawing Figures

PATENTED MAY 20 1975　　　3,884,078

LOW-PRESSURE MEASURING TRANSFORMER

The invention relates to a low-pressure measuring transformer, in particular for explosion-prevention devices, comprising an expansion joint impinged upon the measuring pressure and carrying strain gauges.

Similar measuring transformers are in use for example, in refuse incinerators or other large-size containers employed in process engineering for the monitoring of pressure in the containers and usually operate in very low pressure ranges, normally in a measuring range of less than 14 psi. The low measuring range results from the fact that the large-size containers are generally designed for a maximum pressure of 14 psi so that in the event of an explosion higher pressures are not to be expected.

Similar low-pressure measuring transformers are required to reproduce the static pressure prevailing in the container with great accuracy on the one hand, and a relatively high natural frequency on the other hand, so as to make it possible for rapid pressure rises as usually occur in connection with explosions, to be safely and precisely determined.

It is furthermore, necessary to provide for a high degree of insensibility to accelerating influences in order to preclude any undue releases of alarm devices and valve systems controlled by means of the measuring transformer as a result of purely operational shocks such as are liable to occur in mills, for example in ball mills or in refuse crushing plants.

It is the purpose of the present invention to provide a low-pressure measuring transformer of this type, meeting the above requirements in every respect and distinguishing itself by it simple construction and high operational safety. For that purpose, the expansion joint is, according to the invention, designed as a thin-walled tube impinged upon internally by the measuring pressure and supported with its open extremities by the adjacent transformer members in such a manner as to provide both elasticity and effective sealing.

On the one hand, the absolutely elastic suspension of the expansion joint by means of the stationary transformer members offers the advantage of a high degree of deformability already at relatively low pressures, and on the other hand, the transmission of accelerating influences, in particular, of high-frequency oscillations to the measuring element is considerably attenuated. In addition, the elastic support of the expansion joint results in excellent electric insulation of the expansion joint against the other members of the transformer.

Moreover, such a low-pressure measuring transformer comprises only a small number of structural elements which are simple to manufacture, resulting in relatively low material requirements and production costs.

According to a preferred embodiment of the invention the transformer members carrying the tubular expansion joint are designed as rigidly interconnected stop plates, each of them presenting an annular groove on the faces opposite each other, wherein an elastic flat ring and two adjacent O-type rings located side by side are provided, the flat ring being preferably integral with these O-type rings between which the open tubular extremity of the expansion joint is clamped down. This type of measuring transformer distinguishes itself by the simplicity of the elastic attachment of the expansion joint with the use of commercial annular packings.

The flat ring provides elastic axial support and electrically insulating separation of the tubular expansion joint from the two stop plates. Where a sectional elastic ring is used instead of a flat ring and two O-type rings, the assembly of the expansion joint is particularly simple.

According to another embodiment of the invention it is particularly advantageous to use a tubular expansion-joint having a flattened O-shaped or oval cross-section and to provide a strain gauge approximately in the middle of each broadside of the tubular jacket. An expansion joint of this type tends to deform itself as a result of a compressive load applied from the inside in such a manner that it approaches the round shape of cross-section. Deflection of the flattened broadsides of the expansion joint as a result of increasing internal pressure then produces an appropriate measuring signal.

According to a further feature of the invention a compensating strain gauge is provided at each of the arcuate narrow sides of the tube jacket, as well as a measuring bridge where the strain gauges and the compensating strain gauges are each arranged in opposite bridge arms. This design of the measuring transformer produces a high degree of insensibility of the instrument to temperature fluctuations. The compensating strain gauges are mounted on the narrow sides of the expansion joint in such a manner that pressure impacts in these ranges will not produce any change of resistance. When the temperature of the expansion joint is changed by the ambient temperature or as a result of the penetration of hot explosion gases into the interior of the expansion joint, both the active strain gauges and the compensating strain gauges are heated or cooled in a uniform manner. Since the signals of the active strain gauges produced under the influence of temperature cancel the signals of the compensating strain gauges out, faulty records of the instrument due to temperature are avoided.

In the event of accelerating influences effective in the direction of the longitudinal axis of the transformer, the resulting deformation of the expansion joint is almost nil so that significant interfering signals are not produced. On the other hand, accelerations effective in transverse relation to the transformer axis cause a deformation of the expansion joint and consequently, produce interfering signals. However, inasmuch as in the event of a transverse acceleration directed in perpendicular relation to the flattened broadsides of the expansion joint, one of the broadsides deflects inwardly and the other deflects outwardly, opposing interfering signals are produced in the two bridge arms canceling each other out. For that reason, there is no acceleration sensibility of the measuring transformer in transverse direction worth mentioning either.

Finally, according to the invention, one of the transformer members carrying the expansion joint may comprise an adapter nipple to be screwed in at the measuring point, with an axial bore from which a number of bores emerge which terminate in the interior of the expansion joint. This arrangement ensures uniform pressure distribution inside the expansion joint on the one hand, and allows the explosion gases entering the expansion joint to cool off on the larger surface of the overflow bores on the other hand.

Figure 3:
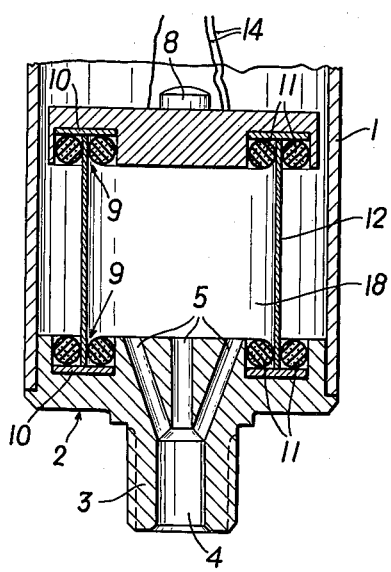
Figure 2:
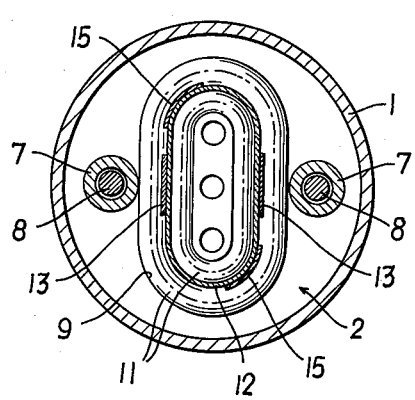
Figure 4:
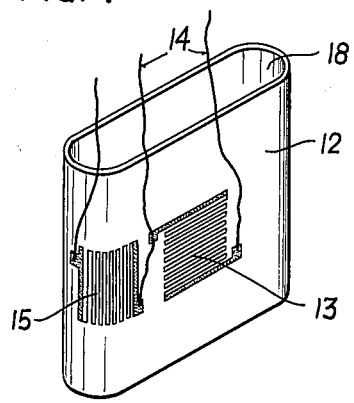

Further details of the invention will become apparent from the following description of a preferred embodiment of the invention with reference to the accompanying drawing in which FIG. 1 shows an axial cross-sectional view of a low-pressure measuring transformer according to the invention, FIG. 2 shows a cross-sectional view of the transformer on line II—II of FIG. 1, FIG. 3 another axial cross-sectional view of the measuring transformer on line III—III of FIG. 1, FIG. 4 a perspective view of the expansion joint of a measuring transformer as shown in FIGS. 1 to 3, and FIG. 5 is the schematic diagram of such a measuring transformer.

The housing 1 of the measuring transformer (only partly shown in the drawing) is closed at one extremity by means of a stop plate 2 with a concentrically arranged adapter nipple 3. By means of the adapter nipple 3 the measuring transformer can be screwed into a receiving bore provided at the measuring point. The adapter nipple 3 comprises an outwardly open axial blind-end bore 4 from which three connecting bores 5 emerge which terminate on the opposite front end of the stop plate 2.

A second stop plate 6 is provided at an axial distance from the stop plate 2 determined by two spacer sleeves 7 and rigidly connected with said stop plate 2 by means of two fixing screws 8 traversing the spacer sleeves 7.

On their opposing front faces the two stop plates 2 and 6 each have an oval annular groove 9 including a flat rubber ring 10 and two O-tape rings 11 adjacent to the flat rubber ring and located side by side. Between the two stop plates 2 and 6 the expansion joint 12 of the measuring transformer is located, designed as a thin-walled tube of an O-shaped cross-section each of whose open extremities are elastically clamped down between the outer and the inner O-shaped ring 11, respectively, the annular front ends of the expansion joint 12 adjoining the flat rubber rings 10.

Approximately in the middle of the opposing flattened broadsides of the expansion joint 12 two strain gauges 13 are attached to the outer surface of the expansion joint 12. These two strain gauges 13 represent the measuring elements of the instrument serving to record the measured value proper. Their connections 14 extending through the stop plate 6 are attached therein for traction relief. The connections 14 lead to a connection plug (not shown in the drawing) of the measuring transformer or directly to an amplifier directly incorporated in the transformer housing.

To the arcuate narrow sides of the outer surface of the expansion joint 12 two additional strain gauges 15 serving for the temperature compensation of the instrument are attached. They are arranged in such a manner that any alteration of the curvature of the expansion joint 12 caused by the measuring pressure will not produce any change of resistance in this compensating strain gauge 15.

Figure 5:
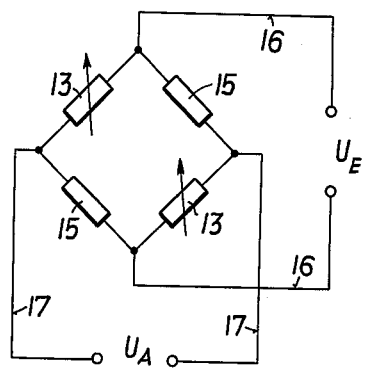

The connections of the strain gauges 13 and of the compensating strain gauges 16 are interconnected so as to produce the bridge circuit shown in FIG. 5. The supply voltage $U_E$ is supplied to the measuring bridge via lines 16 and the measuring signal $U_A$ is received via lines 17.

In operation, the interior 18 of the expansion joint 12 is impinged upon by the measuring pressure via bores 4 and 5. The elastic clamping of the thin-walled expansion joint 12 permits a certain deformation of same consisting in an outward deflection of the normally plane surface of the broadsides of the expansion joint 12. As a result, the resistance of the active strain gauges 13 is altered so that an appropriate measuring signal $U_A$ is released at the output of the bridge circuit. The resistance of the compensating strain gauges 15, however, is not altered.

If the expansion joint 12 is subject to temperature fluctuations caused, for example, by any change of the ambient temperature or by hot explosion gases penetrating into the interior 18 of the expansion joint 12, both the strain gauges 13 and the compensating strain gauges 15 are heated or cooled to the same degree, as the case may be. Due to the bridge circuit the signals of the active strain gauges 13 produced as a result of temperature influences are cancelled out by the corresponding signals of the compensating strain gauges 15. The measuring voltage $U_A$ is therefore, not influenced by temperature fluctuations.

The influence of acceleration forces is almost completely eliminated in the measuring transformer hereabove described. Accelerations active in the direction of the longitudinal axis of the transformer hardly produce any deformation of the expansion joint 12, whereas accelerations which are active in transverse relation to the transformer axis cause an outward deflection of the surface on one side of the expansion joint 12 and an inward deflection on the other side. As a result, opposing interference signals are produced in the two bridge arms which cancel each other out.

I claim:

1. A low-pressure measuring transformer, in particular for explosion-prevention devices, comprising a housing having an open extremity, a bottom portion terminating the housing at said open extremity and having a central through bore, an abutment arranged in the housing in spaced relation to said bottom portion, said bottom portion and said abutment being designed as rigidly interconnected plates having an annular groove on each of the front ends opposing each other, a flexible flat ring and two O-shaped rings each adjoining same being arranged in concentric relation to each other and being inserted in each of the annular grooves, an expansion joint designed as a thin-walled tube open at both ends extending from said bottom-portion as far as said abutment, each of the open tube ends protruding into one of the annular grooves of the bottom portion and of the abutments and clamped between the concentrically arranged O-shaped rings so as to form a flexible seal, at least two strain gauges located in opposite outer surfaces of said expansion joint, the expansion joint being impinged upon internally by the pressure to be measured through the bore of the bottom portion.

2. A measuring transformer according to claim 1, wherein said flexible flat ring is integral with the two concentrically arranged O-shaped rings adjoining same.

3. A measuring transformer according to claim 1, wherein the tubular expansion joint is of a O-shaped flattened cross-section, each of the flattened broadsides of its jacket carrying one of said strain gauges approximately in the middle.

4. A measuring transformer according to claim 3, comprising a compensating strain gauge each arranged on the arcuate narrow sides of the jacket of the tubular expansion joint, an electric resistance-measuring bridge comprising four bridge arms, the strain gauges being arranged in two opposite bridge arms and the compensating strain gauges in the remaining two opposite bridge arms.

5. A measuring transformer according to claim 1, wherein the tubular expansion joint is of an elliptic cross-section and carries one of the strain gauges approximately in the middle of the flattened broadsides of its jacket.

6. A measuring transformer according to claim 1, wherein the bottom portion comprises an adapter nipple to be screwed in at the measuring point and traversed by the bore of the bottom portion, and wherein a number of additional bores are provided emerging from the first-mentioned bore of the bottom portion and terminating in the interior of the tubular expansion joint.

* * * * *